(12) United States Patent
Morton et al.

(10) Patent No.: US 6,486,937 B2
(45) Date of Patent: *Nov. 26, 2002

(54) METHOD AND APPARATUS FOR PRINTING LARGE FORMAT LENTICULAR IMAGES

(75) Inventors: Roger A. Morton, Penfield, NY (US); Timothy J. Tredwell, Fairport, NY (US)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/476,478

(22) Filed: Dec. 30, 1999

(65) Prior Publication Data

US 2002/0075462 A1 Jun. 20, 2002

(51) Int. Cl.[7] .......................... G03B 27/32; B41J 2/435
(52) U.S. Cl. .......................... 355/22; 355/33; 347/248
(58) Field of Search .......................... 355/22–26, 33, 355/77; 430/22, 30; 396/330; 347/233, 238, 241–243, 248

(56) References Cited

U.S. PATENT DOCUMENTS

| 3,485,945 | A | | 12/1969 | Sokolov | 430/946 |
|---|---|---|---|---|---|
| 5,349,419 | A | | 9/1994 | Taguchi et al. | 355/22 |
| 5,673,100 | A | | 9/1997 | Morton | 355/22 |
| 5,681,676 | A | | 10/1997 | Telfer et al. | 430/22 |
| 5,812,152 | A | * | 9/1998 | Torigoe et al. | 347/2 |
| 5,835,194 | A | * | 11/1998 | Morton | 355/22 |
| 5,850,580 | A | * | 12/1998 | Taguchi et al. | 396/330 |
| 6,087,054 | A | * | 7/2000 | Cobb et al. | 430/30 |
| 6,252,621 | B1 | * | 6/2001 | Kessler et al. | 347/233 |

FOREIGN PATENT DOCUMENTS

| JP | 42-5476 | 3/1967 |
|---|---|---|
| JP | 48-6488 | 2/1973 |
| JP | 49-607 | 1/1974 |
| JP | 53-33847 | 9/1978 |
| JP | 59-3781 | 1/1984 |

* cited by examiner

*Primary Examiner*—Hung Henry Nguyen
(74) *Attorney, Agent, or Firm*—Nelson Adrian Blish

(57) ABSTRACT

A method and apparatus for printing large format lenticular images on a lenticular sheet (902) having a plurality of generally parallel lenticules (903) on a front side of the lenticular sheet (902). A sensor (209) senses a beginning of each lenticule (903). A printhead (102) prints interleaved image information on the lenticular sheet (902) in a series of swaths (220). A width of each of the swaths (220) is less than a width of the lenticular sheet (902). Each of the swaths (220) is printed in a direction parallel to the lenticules (903) and each of the swaths (220) is printed in a direction perpendicular to the lenticules (903).

26 Claims, 6 Drawing Sheets

METHOD AND APPARATUS FOR PRINTING LARGE FORMAT LENTICULAR IMAGES

FIELD OF THE INVENTION

The present invention relates in general to printing stereoscopic images, multiple images, or motion images; and in particular to a method for printing interdigitated images or a lenticular medium.

BACKGROUND OF THE INVENTION

Lenticular overlays are a means of giving images the appearance of depth. A lenticular image is created using a transparent upper layer having narrow, parallel lenticules (semi-cylindrical lenses) on an outer surface, and an image-containing media. The two layers form a lenticular system wherein different portions of an image are selectively visible as a function of the angle from which the system is viewed.

If the image is a composite picture made by bringing together into a single composition a number of different parts of a scene photographed from different angles and the lenticules are oriented vertically, each eye of a viewer will see different elements and the viewer will interpret the net result as depth of field. The viewer may also move his head with respect to the image thereby observing other views with each eye and enhancing the sense of depth. When the lenticules are oriented horizontally, each eye receives the same image. In this case, the multiple images give illusion of motion when the composite image is rotated about a line parallel to a line formed by the viewers eyes.

Whether the lenticules are oriented vertically or parallel, each of the viewed images are generated by lines of images which have been interlaced at the frequency of the lenticular screen. Interlacing lines of each image is referred to as interdigitation. Interdigitation can be better understood by using as an example four images used to form a composite with a material having three lenticules. In this example, line 1 from each of the four images is in registration with the first lenticule; line 2 from each of the four images is in registration with the second lenticule; etc. Each lenticule is associated with a plurality of image lines or an image line set, and the viewer sees only one image line of each set with each eye for each lenticule. It is imperative that the image line sets be registered accurately with respect to the lenticules, so that the proper picture is formed when the assembly is viewed.

Conventional recording of linear images on a lenticular recording material has been accomplished with a stereoscopic image recording apparatus that uses optical exposure. A light source, such as a halogen lamp, is projected through an original image, through a projection lens, and focused on lenticular material. The images are exposed on a receiver attached to the lenticular material as linear images. Japanese (Kokoku) Patent Application Nos. 5473/1967, 6488/1973, 607/1974, and 33847/1978 disclose recording apparatus in which two original images are projected for printing on a lenticular recording material. Recording composite images in this fashion requires complex lens structures, which are expensive.

In contrast, image recording by scanning exposure requires comparatively simple optics, has great flexibility in adapting to various image processing operations, and to alterations in the dimension of the lenticules. To take advantage of these features, various apparatus and methods have been proposed for recording image by scanning exposure. For example, Japanese (Kokoku) Patent Application No. 3781/1984 teaches a stereoscopic image recording system in which a plurality of original images is taken with a TV camera, processed and stored in frame memories from which the stored image signals are retrieved sequentially as linear images in accordance with the pitch of lenticular lenses used. After the linear images are recorded on a recording material by scanning exposure, the lenticular sheet is bonded to the recording material. Another scanning method uses polygon scanners, described in U.S. Pat. No. 5,349,419, for exposure of photosensitive stereoscopic images directly on lenticular materials.

In order to manufacture lenticular images, a small spot size and long straight uniform scan lines are needed. U.S. Pat. No. 3,485,945 describes a system for producing high quality lenticular images writing images directly onto the back of lenticular material.

One inherent limitation of direct writing techniques is that in order to achieve large high resolution images the scan lines must be written with a small spot size and must be written as long straight lines. This results in a scan line length to spot size ration, which is so large as to be impractical. As a result, the optical design of the device for scanning the lines which form the image, and which must provide a uniform scan which maintains linearity alignment and spot size specifications throughout its scan length, becomes impractical. Whether the scanning device is a cathode ray tube, a scanned light beam, a scanned beam of electrons, a thermal resistive head, or other image-scanning device, the requirement of small spot size and long, straight, uniform scan lines may not be achievable at a reasonable cost. This problem is aggravated because the scan lines must be parallel to the lenticules or across the lenticules, throughout the entire length of the scan.

To make large, high quality lenticular images requires writing scan lines which are accurately aligned to the lenticular material over the entire of the image. Because the precision required is proportional to the number of views and the size of the lenticules, increasing the size of the lenticules and reducing the number of views has solved the problem in the past. The disadvantage of decreasing the number of lenticules is that the image has lower apparent resolution and the lenticular material must be thicker making the image heavier and more expensive because of the additional material required. Another disadvantage of decreasing the number of views is that all the overall image quality is reduced.

In prior art applications, lenticular views have been digitally written in a single scan thereby limiting the dimensions of the image produced to the size of the printer scan, or necessitating the use of an enlarger which decreases image quality and increases the cost of manufacturing. See Method for Enlarging Images for Lenticular Prints by R. R. A. Morton, U.S. Pat. No. 5,673,100.

SUMMARY OF THE INVENTION

It is an object of the present invention to provide a method and apparatus for printing large format lenticular images.

According to one aspect of the present invention, an apparatus for printing large format lenticular images on a lenticular sheet having a plurality a generally parallel lenticules on a front side of the lenticular sheet, comprises a sensor which senses a beginning of each lenticule. A printhead prints interleaved image information on the lenticular sheet in a series of swaths wherein a width of each of the swaths is less than a width of the lenticular sheet. In one embodiment, each of the swaths is printed in a direction parallel to said lenticules. In another embodiment, each of the swaths is printed in a direction perpendicular to said lenticules.

In the preferred embodiment, a narrow scanning spot prints on a silver halide emulsion on a backside of the lenticular sheet. According to another aspect of the invention, the spot is elongated.

An advantage of the present invention is that when printing in swaths perpendicular to the direction of the lenticules, lenticular rows, which are not straight, do not degrade the quality of the image.

The invention and its objects and advantages will become more apparent in the detailed description of the preferred embodiment presented below.

DETAILED DESCRIPTION OF THE INVENTION

Figure 1:
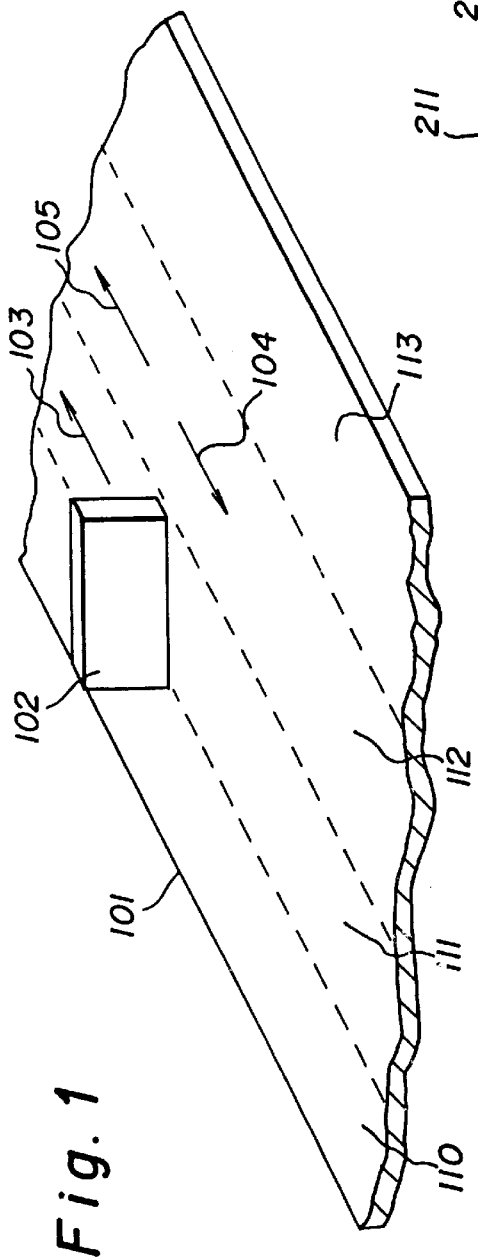
FIG. 1 shows a perspective view of a printhead, printing swaths on a media according to the present invention.

FIG. 1 shows an media 101 on which is to be placed an image. The media 101 used for printing lenticular images is typically comprised of parallel rows of lenticules on a first side of the media 101 and a receiver on another side of the media. A printhead 102 traverses the media in direction 103 to sweep out swaths 110, 111, 112 and 113 across the media. The direction of the printhead swath 112 may be in direction 104 or in direction 105. Thus, printhead 102 after printing swath 111 in direction 103 may return to the beginning of swath 112 and print in a direction 105, or after completion of swath 111 the printhead may be moved laterally and print swath 112, moving in a direction 104.

The printhead 102 may be a laser scanner, cathode ray tube, thermal resistive head, an ink jet head, or other device for directing energy or dye to the media 101. In the case of directing energy on the media, the printing process may be comprised of silver halide, dye sublimation thermal, dye diffusion thermal, wax transfer thermal, electrographic, ektaflex or other image forming means.

The control of the printhead 102 is a system which senses preexisting positional data which has been incorporated into the media 101. The signals from this preexisting positional data are used to control the position of the printhead 102 and the flow of image information from the printhead 102 onto the media 101.

Figure 2:
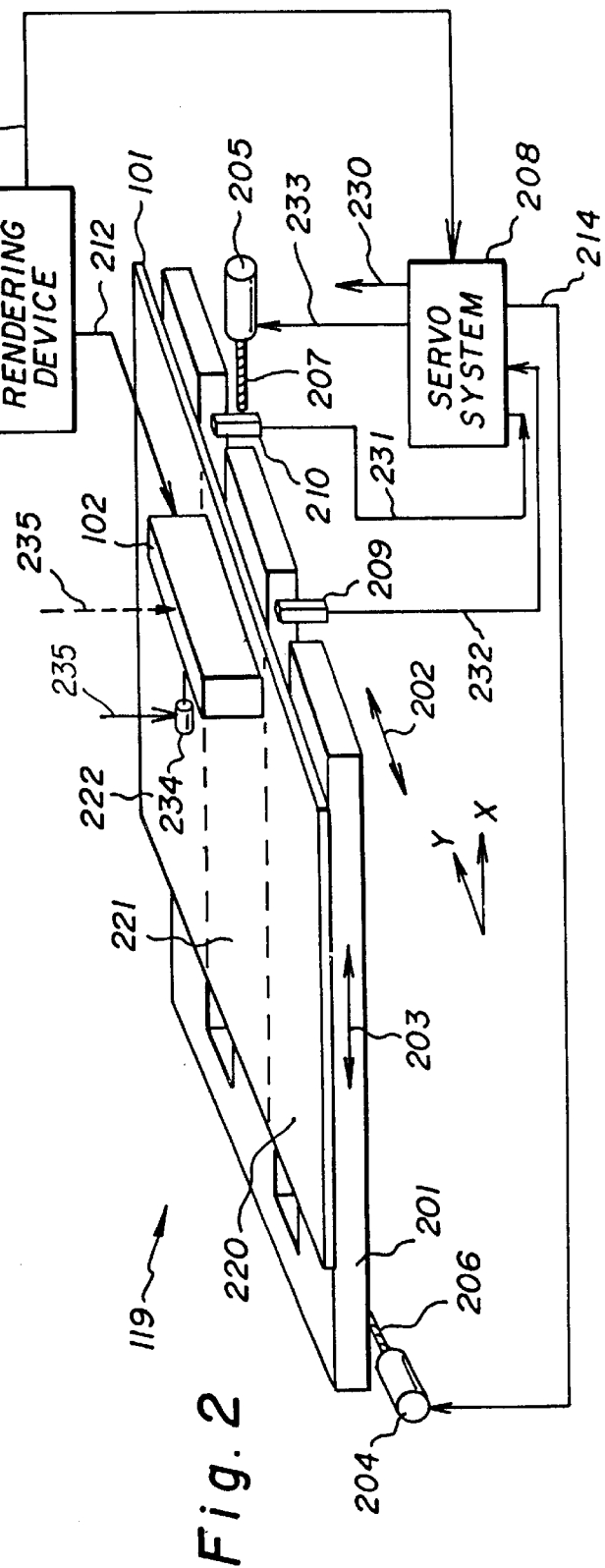
FIG. 2 shows a schematic view of a controller for a printhead according to the present invention.

FIG. 2 shows a controller 119 for controlling the position of the printhead 102. Table 201 supports media 101 and is moved in directions 202 and 203 by control motors 205 and 204. These motors are connected to lead screws 206 and 207, and are driven by servo system 208, which receives control signals from magnetic sensors 209 and 210. Printhead 102 traverses the media 101 as motor 205 turns leadscrew 207 to drive an engaging nut (not shown) and table 201, which supports media 101. Image information passes from image rendering device 211 to printhead 102 along connection 212. Rendering device 211 produces desired X and Y positional data along line 214 to servo system 208. Direction X corresponds to direction 203, and Y corresponds to direction 202.

Data from sensors 209 and 210, corresponding to X, Y coordinates, is compared in servo system 208 with the desired XY location generated on line 213 by renderer 211, and servo system 208 generates control signals to motor 205 and motor 204 along line 214 so that the position of table 201 corresponds to the desired position specified by renderer 211 on line 213. Thus, along the central swath 221 of the three swaths, 220, 221 and 222, an image is written at points predetermined by sensors 209 and 210, sensing reference marks, or preexisting positional data, which is written in magnetic form on the underside of media 101. It will, however, be appreciated that other marks such as infrared, fluorescent inks, embossing marks, electrostatic signals, x-ray detectable signals, changes in resistively, elevation, or other locating marks could be used.

In order to write swath 220, table 201 is moved by servo motors 204 and 205 to the position shown in FIG. 2. That the table may move in direction 202 while keeping the sensors clear of the ends of the supports of the table 201 so that the sensors may traverse underneath the media 101 along either side of swath 220. To achieve this, the media 101 overhangs the table 201. It is now possible to traverse the image printhead 102 along swath 220. The renderer 211 generates image signals along connection 212 to print swath 220 which abuts the image data along swath 221. Renderer 211 also generates X and Y control signals to servo 208 such that the passage of image printhead 102 along swath 220 causes image data to precisely be aligned with the image data on swath 221, as shown in FIG. 3.

It will be appreciated that the arrowheads on interconnecting lines, for example 212, 213 and 214, which indicate the primary but not the exclusive flow of information along these interconnecting lines. Image information, for example acknowledgement signals, device status, information associated with servo loops inside the main servo loop, homing signals, synchronizing signals, clock signals, and similar information, may pass in the direction which is opposite or the same as the arrow shown. Thus, it will be appreciated that these arrowheads are included for the clarification and understanding in the mind of the reader so as to communicate the upper level system performance of the equipment rather than the detailed performance.

Figure 3:
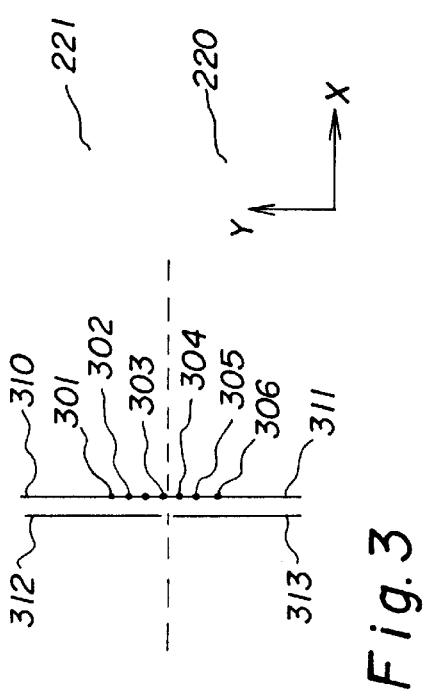
FIG. 3 shows a plan view of scan lines for adjacent swaths.

FIG. 3 shows in magnified form the way in which scan lines traversing across swath 221 abut the scan lines associated with swath 220. The scan lines, which comprise the swath lines, are comprised of individual pixels. For example, 301, 302 and 303 on scan line 310 on swath 221; and 304, 305 and 306 on scan line 311 on swath 220. Similar arrangements also occur on scan lines 312, 313 as well as subsequent and precedent scan lines.

The scan lines need not contain exclusive abutting pixels such as pixel 303 associated with scan line 310, and pixel 304 associated with scan line 311. While this approach is feasible it does depend on the servo system head assembly and table shown in FIG. 2 working in cooperation to achieve positional accuracy whose magnitude is a small fraction, in the range of 0.01 to 0.50 of a pixel spacing and a scan line spacing. This range depends on the viewing conditions of the final image, the overall effective spot size of the system including the size of the spot used to write the pixels, the interactions between the dye or the colorant and the media which receives the dye or the colorant. It also depends on a number of other imaging system factors including the viewing distance and visual acuity of the observer.

Figure 5:
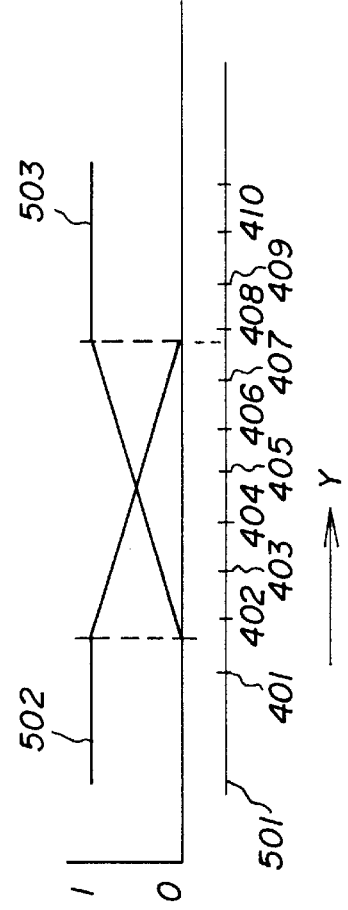
FIG. 5 is a graph showing blending of data from the embodiment shown in FIG. 4.
Figure 4:
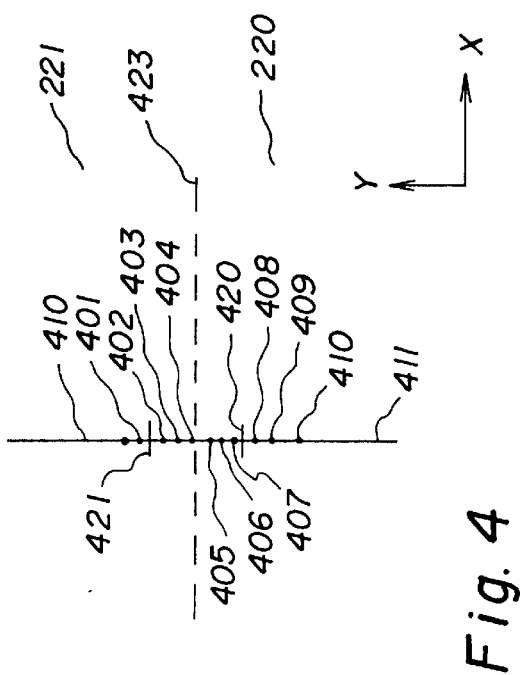
FIG. 4 shown a plan view of scan lines in adjacent swaths for an alternate embodiment of the present invention.

An alternate way to insure that the swaths 220 and 221 have visually imperceptible seams between them is to blend the pixels at the boundaries where the seams occur. This is shown in FIG. 4 where scan line 410 extends across the boundary 423 between swath 221 and 220 to point 420, and scan line 411 extends across boundary 423 to point 421, such that pixels 402, 403, 404, 405, 406 and 407 are written by both scan lines 410 and 411. In addition, pixel 401 and adjoining pixels along scan line 410 in the direction away from pixel 402, are only written by scan line 410. A similar condition applies for pixel 408, 409 and so on with respect to scan line 411. In this alternative implementation servo system 208 blends the pixel data as shown in FIG. 5. A profiling technique is used, which can be shown by considering positions along line 501 to correspond to the positions in the Y direction along scan lines 410 and 411. The desired image data for pixels along scan line 410 is multiplied by a profile shown as 502 which at position corresponding to pixel 402 in the Y direction has an amplitude of unity and declines to a value of zero for pixel 408.

Figure 6:
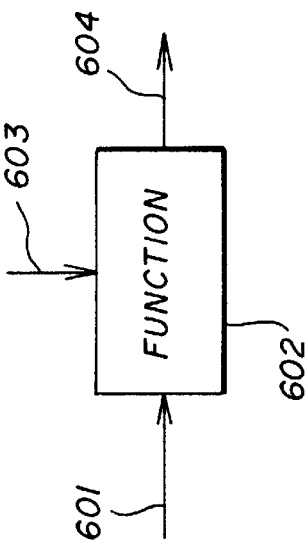
FIG. 6 is a schematic view of blending video amplitude data.

FIG. 6 shows the way in which video amplitude data on line 601 is processed to achieve the desired blending effect. The data on 601 enters function 602 which also receives the amplitude data as a function of Y corresponding to the amplitude shown in FIG. 5 as profile 502. This data is entered on line 603. Function 602 may be a multiplier or a two dimensional look up function, which produces an amplitude on line 604, which is the product of 601 and 603 or some other monotonically related function selected or experimentally determined to ensure that the blending technique produces a visually imperceptible result in the final image. For example, while the amplitude on data line 601 may correspond to the amplitude of the energy written by printhead 102 the final desired blending effect may be based on density blending rather than intensity blending and to achieve this it may be necessary that the profile along 502 as well as the relational function between the amplitude on line 603 and the amplitude on line 604 be nonlinear. Furthermore this function may vary as a function of the different color channels which are controlled through the data on 601. Similarly, profile 503 controls the amplitude along scan line 411 so that the data corresponding to pixels 402 to 410 and subsequent pixels is modified in a manner similar to the pixels along scan line 410.

It will be appreciated that generally, whether printing scan line 410 or 411, the data on line 601 at, for example pixel 403, will be the same however, the data on line 603 will correspond to profile 502 for scan line 410 and 503 for scan line 411. Thus, pixels 402 to 407 are written twice, once on scan line 410 and once on scan line 411, and the resultant visually perceived pixel is therefore less sensitive to the alignment between scan line 410 and 411 and to the alignment between adjoining pixels.

Figure 7:
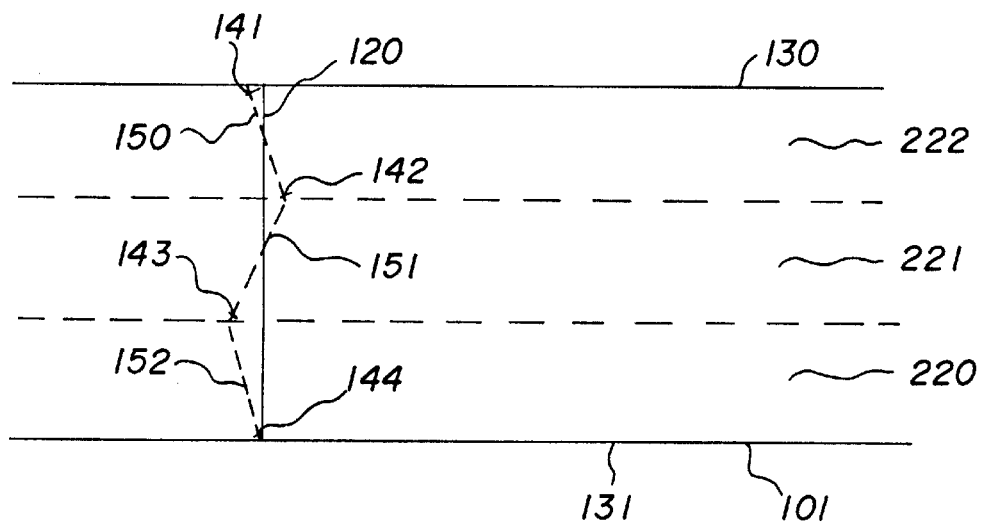
FIG. 7 shows misalignment of reference marks in the media.

One other cause of misalignment is that the reference marks or preexisting positional data used to locate XY coordinates on the media 101 may not fall on a regular grid pattern. This may occur due to errors in the mechanism that positions these marks on the media or due to distortion of the media subsequently to the writing of the media. This is shown diagrammatically in an exaggerated sense in FIG. 7, wherein the preexisting positional marks for scan line 120, which goes from one edge 130 to the other edge 131 of the media, are not perfectly aligned. Thus, instead of being as shown by the solid line, the preexisting positional marks, which are shown as 141, 142, 143 and 144, will require that for adequate alignment scan lines be written along dashed lines 150, 151 and 152. Provided these lines are straight an angular displacement of printhead 102 as it traverses swath 220, 221 and 222 is able to compensate for this distortion and still achieve accurate alignment of the image between the swaths. While the preexisting positional marks 141, 142, 143 and 144 may be in a straight line, the writing printhead 102 is not accurately aligned from am angular point of view to the preexisting positional marks.

To overcome both the problem of the preexisting positional marks not being correctly aligned, the head not being accurately aligned from an angular point of view and similar effects, it is possible, while writing the image, to make small changes to the angle of the head with respect to the direction of the motion.

Figure 8:
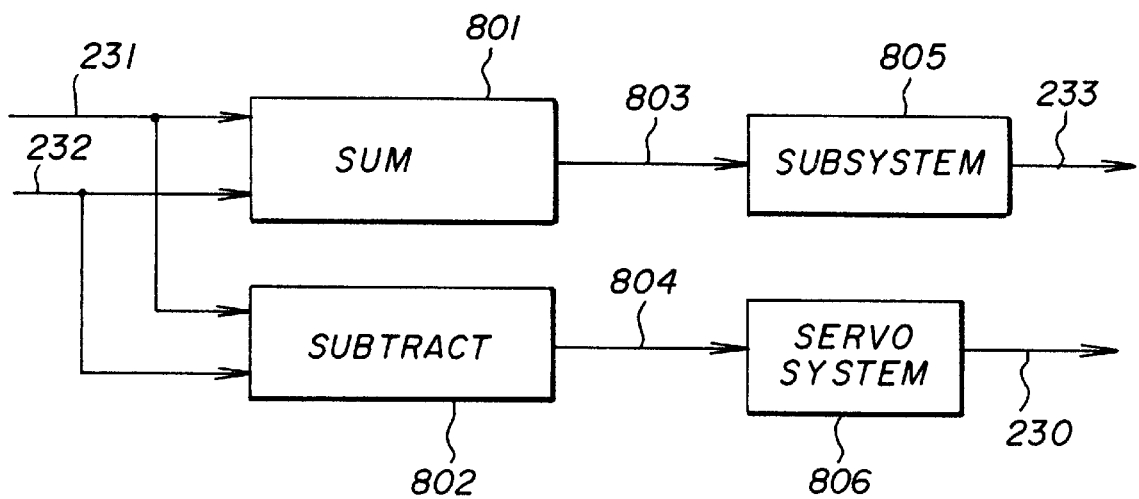
FIG. 8 is a schematic view of a servo system for correction of angular position.

The servo system 208 is shown in FIG. 2 has the added capability of sensing the phase difference between position sensor 209 and position sensor 210 as well as the average position. This can be used for angular correction. This is shown in FIG. 8, wherein the connecting line 231 from position sensor 210 and the connecting line 232 from position sensor 209 contain the instantaneous X, and possibly Y, coordinates of the current position of the media 101. The X coordinates are fed to a summing function 801. The sum of two X coordinates is divided by 2 and may be temporarily averaged to remove small amounts noise corresponding to residual noise in the current X coordinate values of the media. The same signals corresponding to the instantaneous X coordinate of the base on lines 231 and 231 from sensors 210 and 209 are sent to the subtract function 802 whose output on line 804 corresponds to the angular difference between the preexisting positional marks on the media. Again, temporal averaging may be used. The signal on line 803 corresponding to the current position is sent to the servo subsystem 805 which controls motor 205 on line 233 to control the velocity and position of the media 101. While the subtract signal corresponding to the angular difference on line 804 goes to angular servo system 806 which through line 230 connects to motor 234. This motor controls the angle of printhead 102 which is mechanically pivoted about axis 235 which axis is placed at the center axis of the scanning head such that angular changes do not change its average position in the X direction. Consequently, small angular changes in the position of the scan line traversing swath 221 may be made. Thus, FIG. 8 shows in more detail a portion of the operation of servo system 208. Other components of servo system 208 for example, will include power supply, synchronizing functions etc.

Other methods for achieving angular alignment including rotating the media and maintaining the head stationary or rotating an element within the head so that the scanning direction is able to be angularly adjusted. Additional methods are shown in U.S. Pat. No. 5,830,194.

As already discussed above, there are a variety of techniques for establishing the preexisting positional marks.

These include writing magnetic data on a magnetic layer which may be either on the receiver side or the lenticular of the media. Some constructions may involve the use of additional layers to embed the image-forming layer within the media. However, at the time the image is written the receiver, or image-forming layer, is generally exposed with respect to the supporting media. In addition, preexisting positional data or marks may be placed at some layer that is internal to the media at the time the image is written.

Other methods for forming the preexisting positional marks for referencing the image position along swaths include fluorescent dyes that may be caused to fluoresce in invisible or non-visible spectral frequencies using radiation which may also be visible or non-visible. A further method is to embed voids that may be detected ultrasonically, by optical means, or by other means. Another method is to use embedded or surface charge that may be detected to provide positional information. In addition, the resistively either surface or bulk may be modified to establish reference marks. A further method of producing is polarizing the surface of the media to provide detectable marks or to change the reflectivity or texture of the surface.

Another method of producing reference marks is to place yellow reference marks, which might by microscopic and therefore will not disturb the appearance of the image. Yet another embodiment uses marks which are visible only to light which is outside of the sensitive spectrum of the media such as IR marks or UV marks spectrum. Reference marks may be removed during subsequent processing of the imaging media.

A further method of producing reference marks is to burn pits into the surface which pits may be optically detected but may not be optically visible to the viewer.

A further method of producing reference marks is to use a holographic optical layer within or on the surface of the image media or image receiver layer.

It is also possible to collectively apply layers using photography and other methods which may be detected by sensors. These methods include thin metalization layers, oxide layers on a metalized media, oxide layers on material media and layers which exhibit other physical or chemical properties whose presence may be detected so as to determine the specific location and therefore constitute preexisting positional data or a preexisting positional mark.

A further method of achieving alignment between consecutive swaths is to encode within a previous swath, codes which may be detected on a subsequent swath. These codes may be written, at the same time as the image content is being written such as by encoding magnetic data into the image concurrent with writing the image.

Image data may also be used to generate a reference code either by writing an IR layer or by using microstructure within the visible image that does not degrade the image when viewed by the observer.

It is also appreciated that any of the methods described herein as well as other methods could be placed in the image media, image receiver layer or at any other position within the material which is being written upon.

A preferred embodiment is to use this invention to write lenticular images which are larger than a single scan width. In this case the lenticules which are preformed into the media are used as the preexisting positional data or reference marks to define the position of where scan lines are to be written. See U.S. Pat. No. 5,835,194. See also 09/033,212 "Detection of Pitch Variations in Lenticular Material"; 09/342,391 "Detection and Correction of Skew Between a Writing Laser Beam and Lenticules in Lenticular Material).

Figure 9:
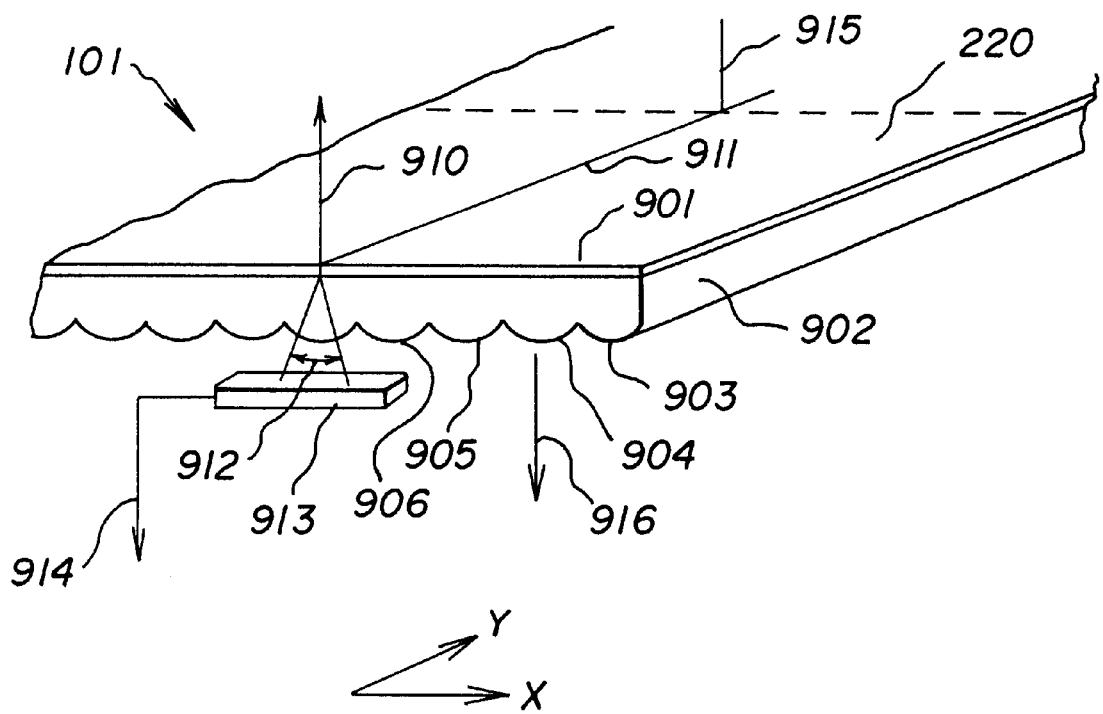
FIG. 9 shows a perspective view of the media and media.

In the preferred embodiment an IR beam is used to sense the position of the lenticules. As shown in FIG. 9 a receiver 901 is bonded on a back surface of media 101. A lenticular sheet 902 comprised of lenticules 903, 904, 905 and 906 is on a front surface of media 101. An IR beam 910 illuminates the lenticular material at points corresponding to the edges of the swaths or alternatively across the full width of a swath being scanned by successive scan lines, for example scan line 911 across swath 220. The beam is deflected at an angle 912 depending on its position with respect to the centerline of the lenticule. A linear array sensor 913 detects the reflected beam, and a signal from the sensor 913 indicates the position of the beam with respect to the lenticule on line 914. A similar sensor, not shown, may be placed on the other side of the swath beneath the position 915. The line 914 and the signal from a sensor positioned below 915 at the other side of the swath which signal emerges on line 916 passes to a module which processes the signal to determine the X coordinates of the media 101, which are then sent to servo system 208 to connect at the points defined by lines 231 and 232.

Figure 10:
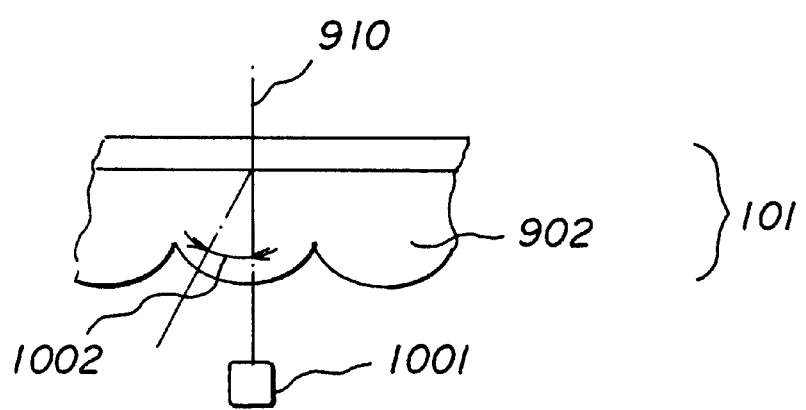
FIG. 10 is a perspective view of the media and media.

Alternatively, rather than have array sensors 913, single position sensors may be used to generate a pulse whenever the beam sweeps across them. Referring to FIG. 10, an example of a single position sensor is 1001 which senses beam 910 that in this case is deflected by its relative position to the lenticule at a different angle 1002 by way of example.

Figure 11:
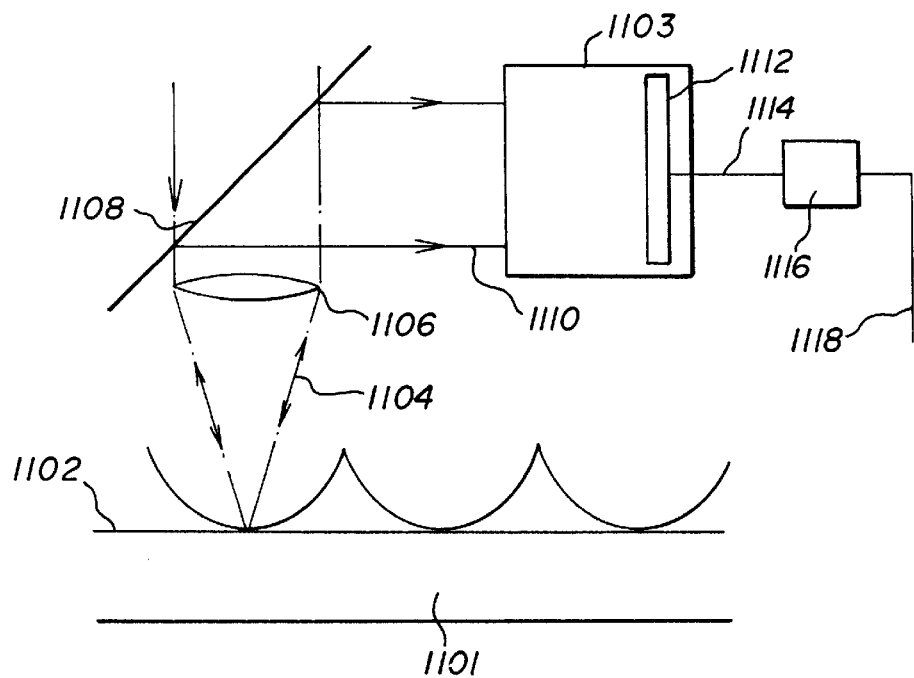
FIG. 11 is a schematic view showing writing of data to the media through the media.

An alternative embodiment, shown in FIG. 11, avoids the need for access to the lower side of the lenticular material and therefore simplifies the design of the stage that supports the lenticular material The lenticular material is placed on a stage 1101, which contains on its upper surface an IR absorbing printhead 102 and the illuminating IR beam comprising collimated bundle 1104 is deflected by lens 1106 in such a way that the beam hits the media air boundary surface defined by the lenticules at right angles and light reflects back along the same path to semi-silvered mirror 1108 to produce a return beam 1110, which is collimated to a sensor and sensed to generate a pulse signal in detector 1112 along line 1114 whenever the beam is directly above the lenticule. The resulting signal is used in element 1116 to generate an X coordinate on line 1118. This line may then be connected to servo system 208 at the points defined by the connection of line 231 and for a similar assembly for example 211 on the other side of the swath. The output of this assembly would then be connected to the point on servo system 208 corresponding to the point where line 232 connects. To maximize the signal to noise of the responding signal it is desirable to ensure that the surface of stage 1101 is highly IR absorbent thereby minimizing spurious reflections.

Throughout this disclosure it will be appreciated that the principles described can be applied to other configurations for writing on imaging medias. These include a capstan drive for the media such as found in printing presses and some electrophotographic copiers. Moving the scanning head across the media while keeping the media stationary as well as other configurations. An alternative configuration is to control the synchronization of the writing image data with position of the media rather than that of the media with image data.

An alternative configuration is to write the scan lines across or perpendicular to the lenticules rather than parallel to the lenticules, and sense the position of the scan in relation to the preexisting positional data on the image media. The fast scan is then to controlled rather than the slow scan either by controlling its position based on the image data and the sensed position of preexisting positional data on the image media. Alternatively the scanning across the lenticules can be controlled by synchronizing the writing image data with the position of the media rather than that of the media with image data.

Figure 12:
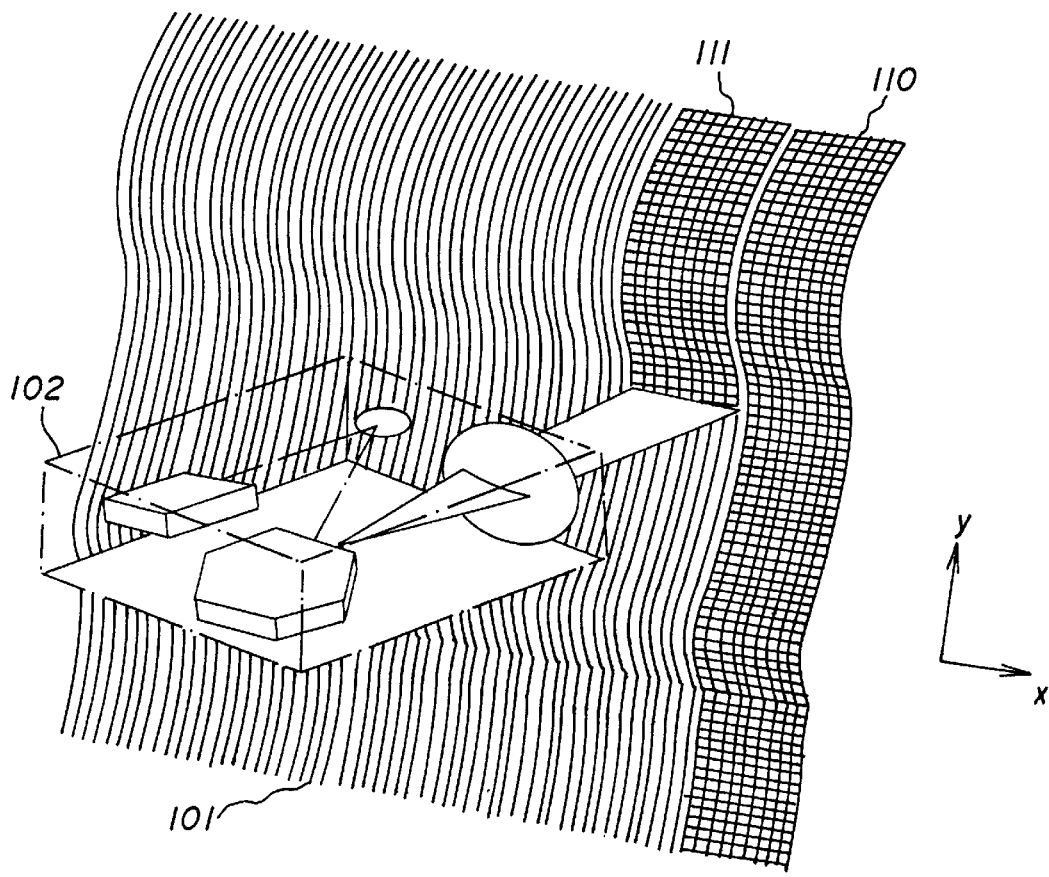
FIG. 12 is a schematic view with the scan line direction perpendicular to the lenticular direction.

Another embodiment of the present invention is shown on FIG. 12. In this embodiment printhead 102 prints a swath at a time with the scan line direction X being perpendicular to the lenticule direction Y. First, swath 110 is printed and then swath 111 and so on till the whole of print 101 is completed. The scan line produced by printhead 102 extends over an integer number of lenticules. The lenticules on FIG. 12 are shown as not being straight. This can be a result of manufacturing limitations of the lenticules. It is an important aspect of this embodiment that the printing is triggered by a signal derived every time the beam crosses into a new lenticule so as to correct for this deviations from straightness of the lenticules.

Figure 13:
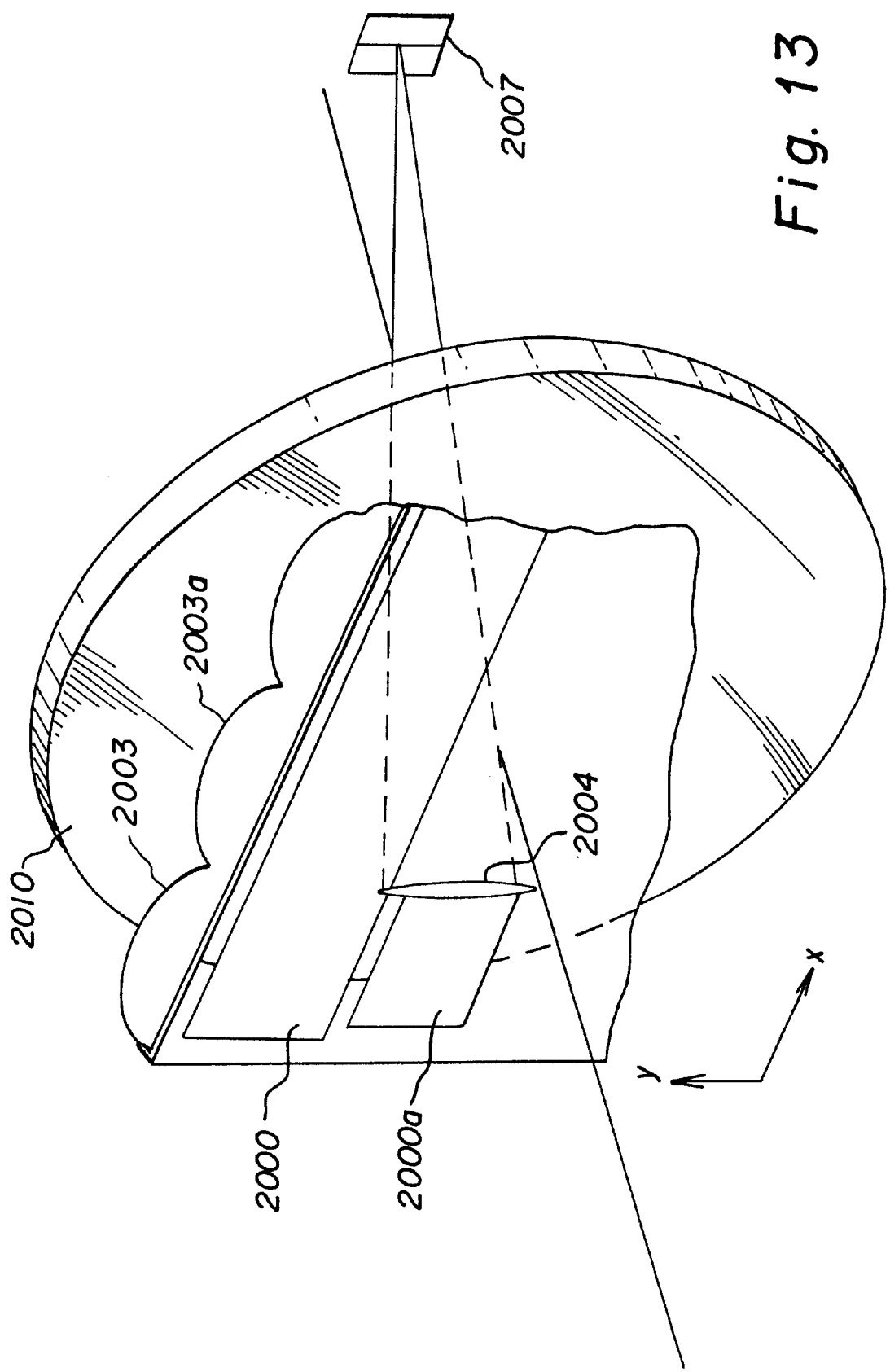
FIG. 13 is a schematic view showing printing through the lenticules.

This process is explained in more detail by referring to FIG. 13. Beam 2004 is shown as it crosses into lenticule 2003a. At that position, some of the beam power, goes through the lenticule and focusing lens 2010 and impinges on position detector 2007, which is placed at the back focal plane of lens 2010. Detector 2007 derives a signal, which is used to trigger the printing over lenticule 2003a. It is obvious that a separate beam can be used for the generation of the "lenticule start signal" other than the writing beam itself. The other beam can be of a different wavelength but it has to be deflected by the same deflector, which deflects the writing beam.

By using the "lenticule start" signal from detector 2007, the deviations from straightness of the lenticules will not effect the quality of the print since the image position is kept in registration with the lenticules. The idea of scanning the beam across the lenticules has been disclosed by Telfer in U.S. Pat. No. 5,681,676. However, in swaths as per the present invention is not found in the prior art.

Scanning of a shorter swaths 2000, 2000a, rather than the entire width of the media, allows printing of very large prints, which would be impossible with a system using a long scan line. As an example consider the printing of a 40 inch by 30 inch print with the lenticules extending along the short dimension. The print time is specified as 5 minutes. Assuming 50 lenticules/inch, the total number of lenticules is 2000. The flying spot polygon based printer covers 80 lenticules. Thus, the number of swaths to cover the whole print is 2000/80=25 swaths. Assuming we have 30 multiplexed images. Therefore, the total number of pixels along the scan line is 80×30=2400. This total number of resolvable spots is very easily achievable with flying spot laser prints. Assuming that the required resolution in the y direction is 100 dots/inch. This means that the pitch between the scan lines is 25.4 microns, or 0.001 inch. From this we can calculate that we have 3000 lines in a swath. With a 10-facet polygon, the polygon will rotate at 1667 RPM. These printer specifications are easily achievable. Since the image information is already segmented by the lenticules, this particular mode of scanning across the lenticules, does not necessitate further segmentation of the image since an integer number of lenticules is covered by the scan line.

The invention has been described in detail with particular reference to certain preferred embodiments thereof, but it will be understood that variations and modifications can be effected within the scope of the invention. For example, the media may be supported on the interior or exterior of a drum for printing.

| PARTS LIST | |
|---|---|
| 101. | Media |
| 102. | Printhead |
| 103. | Direction |
| 104. | Direction |
| 105. | Direction |
| 110. | Swath |
| 111. | Swath |
| 112. | Swath |
| 113. | Swath |
| 119. | Controller |
| 120. | Scan line |
| 130. | Edge |
| 131. | Edge |
| 141. | Preexisting positional mark |
| 142. | Preexisting positional mark |
| 143. | Preexisting positional mark |
| 144. | Preexisting positional mark |
| 150. | Dashed line |
| 151. | Dashed line |
| 152. | Dashed line |
| 201. | Table |
| 202. | Direction |
| 203. | Direction |
| 204. | Motor |
| 205. | Motor |
| 206. | Lead screw |
| 207. | Lead screw |
| 208. | Servo system |
| 209. | Sensor |
| 210. | Sensor |
| 211. | Rendering device |
| 212. | Connection |
| 213. | Line |
| 214. | Line |
| 220. | Swath |
| 221. | Swath |
| 222. | Swath |
| 230. | Line |
| 231. | Connecting line |
| 232. | Connecting line |
| 233. | Line |
| 234. | Motor |
| 235. | Axis |
| 301. | Pixel |
| 302. | Pixel |
| 303. | Pixel |
| 304. | Pixel |
| 305. | Pixel |
| 306. | Pixel |
| 310. | Scan line |
| 311. | Scan line |
| 312. | Scan line |
| 313. | Scan line |
| 401. | Pixel |
| 402. | Pixel |
| 403. | Pixel |
| 404. | Pixel |
| 405. | Pixel |
| 406. | Pixel |
| 407. | Pixel |
| 408. | Pixel |
| 409. | Pixel |
| 410. | Scan line |
| 411. | Scan line |
| 420. | Point |
| 421. | Point |
| 423. | Boundary |
| 501. | Line |
| 502. | Profile |
| 503. | Profile |
| 601. | Line |
| 602. | Function |
| 603. | Line |
| 604. | Line |
| 801. | Function |
| 802. | Subtract function |
| 803. | Line |

-continued

PARTS LIST

| | |
|---|---|
| 804. | Line |
| 805. | Subsystem |
| 806. | Servo system |
| 901. | Receiver |
| 902. | Lenticular sheet |
| 903. | Lenticules |
| 904. | Lenticules |
| 905. | Lenticules |
| 906. | Lenticules |
| 910. | Beam |
| 911. | Scanline |
| 912. | Angle |
| 913. | Sensor |
| 914. | Line |
| 915. | Position |
| 916. | Line |
| 1001. | Element |
| 1002. | Angle |
| 1101. | Stage |
| 1104. | Collimated bundle |
| 1106. | Lens |
| 1108. | Mirror |
| 1110. | Beam |
| 1112. | Detector |
| 1114. | Line |
| 1116. | Element |
| 1118. | Line |
| 2000. | Swath |
| 2000a. | Swath |
| 2003a. | Lenticule |
| 2004. | Beam |
| 2007. | Detector |
| 2010. | Lens |

What is claimed is:

1. An apparatus for printing large format lenticular images on a lenticular sheet having a plurality of generally parallel lenticules on a front side of said lenticular sheet comprising:
   a sensor which senses a position of each of said lenticules;
   a printhead for printing interleaved image information on said lenticular sheet;
   wherein said interleaved image information is printed in a series of swaths wherein a width of each of said swaths is less than a width of said lenticular sheet;
   a controller which receives a lenticule position signal from said sensor and controls a relative position of said printhead and said lenticular sheet; and
   wherein a line of a first swath is aligned with a line of a second swath.

2. An apparatus as in claim 1 wherein each of said swaths is printed in a direction parallel to said lenticules.

3. An apparatus as in claim 1 wherein each of said swaths is printed in a direction perpendicular to said lenticules.

4. An apparatus as in claim 3 wherein each of said swaths covers an integral number of said lenticules.

5. An apparatus as in claim 1 wherein said images are printed on a receiver on a backside of said lenticular sheet.

6. An apparatus as in claim 1 wherein a receiver is on a backside of said lenticular sheet.

7. An apparatus as in claim 1 wherein each of said swaths is comprised of more than one scan line.

8. An apparatus as in claim 1 wherein said sensor senses a reference mark.

9. An apparatus as in claim 8 wherein said reference mark is a microscopic mark.

10. An apparatus as in claim 8 wherein said reference mark is a yellow microscopic dot.

11. An apparatus as in claim 8 wherein said reference mark is a pit on a surface of said lenticular sheet, which is optically detected.

12. An apparatus as in claim 8 wherein said reference mark is a holographic mark.

13. An apparatus as in claim 8 wherein said reference mark is a magnetic mark.

14. An apparatus as in claim 8 wherein said reference mark is located on an infrared layer attached to said lenticular sheet.

15. An apparatus for printing large format lenticular images on a lenticular sheet having a plurality of generally parallel lenticules on a front side of said lenticular sheet comprising:
   a sensor which senses a beginning of each of said lenticules;
   a printhead for printing interleaved image information on said lenticular sheet;
   wherein said interleaved image information is printed in a series of swaths wherein a width of each of said swaths is less than a width of said lenticular sheet;
   a controller which receives a lenticule position signal from said sensor and controls a relative position of said printhead and said lenticular sheet; and
   wherein boundary pixels of one swath are aligned with boundary pixels of an adjacent swath by aligning each of said boundary pixels with one of said lenticule.

16. An apparatus as in claim 15 wherein each of said swaths is printed in a direction parallel to said lenticules.

17. An apparatus as in claim 15 wherein each of said swaths is printed in a direction perpendicular to said lenticules.

18. An apparatus as in claim 15 wherein each of said swaths covers an integral number of said lenticules.

19. An apparatus as in claim 15 wherein each of said swaths is comprised of more than one scan line.

20. An apparatus as in claim 15 wherein said sensor senses a reference mark.

21. An apparatus as in claim 20 wherein said reference mark is a microscopic mark.

22. An apparatus as in claim 20 wherein said reference mark is a yellow microscopic dot.

23. An apparatus as in claim 20 wherein said reference mark is a pit on a surface of said lenticular sheet, which is optically detected.

24. An apparatus as in claim 20 wherein said reference mark is a holographic mark.

25. An apparatus as in claim 20 wherein said reference mark is a magnetic mark.

26. An apparatus as in claim 20 wherein said reference mark is located on an infrared layer attached to said lenticular sheet.

* * * * *